(12) United States Patent
Periorellis et al.

(10) Patent No.: US 8,381,218 B2
(45) Date of Patent: Feb. 19, 2013

(54) MANAGING GROUPS OF COMPUTING ENTITIES

(75) Inventors: Panos Periorellis, Aachen (DE); Lucas Bordeaux, Cambridge (GB); Jeremiah Clayton Spradlin, Seattle, WA (US); Adi Ionel Botea, Canberra (AU)

(73) Assignee: Microsoft Corporation, Redmond, WA (US)

( * ) Notice: Subject to any disclaimer, the term of this patent is extended or adjusted under 35 U.S.C. 154(b) by 263 days.

(21) Appl. No.: 12/956,281

(22) Filed: Nov. 30, 2010

(65) Prior Publication Data

US 2012/0137298 A1 May 31, 2012

(51) Int. Cl.
*G06F 9/46* (2006.01)

(52) U.S. Cl. .................................. 718/102; 718/107

(58) Field of Classification Search .................. 718/100, 718/102, 103, 104, 107
See application file for complete search history.

(56) References Cited

U.S. PATENT DOCUMENTS

| | | | | |
|---|---|---|---|---|
| 7,020,878 | B1 * | 3/2006 | Rhee et al. | 718/104 |
| 7,222,330 | B2 * | 5/2007 | Bicknell et al. | 717/101 |
| 7,526,767 | B1 * | 4/2009 | Rhee et al. | 718/104 |
| 7,984,441 | B2 * | 7/2011 | Briccarello et al. | 718/102 |
| 8,117,606 | B2 * | 2/2012 | Chakrabarti et al. | 717/156 |
| 2005/0027871 | A1 | 2/2005 | Bradley et al. | |
| 2008/0295102 | A1 * | 11/2008 | Akaike et al. | 718/102 |
| 2009/0241117 | A1 | 9/2009 | Dasgupta et al. | |

OTHER PUBLICATIONS

Argelich, et al., "CNF Instances from the Software Package Installation Problem", retrieved on Sep. 20, 2010, Proceedings of Intl RCRA workshop: Experimental Evaluation of Algorithms for Solving Problems with Combinatorial Explosion, Udine, Italy, Dec. 2008, pp. 1-12.

"Automating .NET Application Deployment and Configuration", retrieved on Sep. 20, 2010 at <<http://www.rpath.com/corp/images/stories/white_papers/rPath_WP_Windows.pdf>>, rPath, White Paper, 2010, pp. 1-10.

Brittenham, et al., "IT service management architecture and autonomic computing", retrieved on Sep. 20, 2010 at <<http://ieeexplore.ieee.org/stamp/stamp.jsp?arnumber=05386560>>, IBM Systems Journal, vol. 46, No. 3, 2007, pp. 565-581.

"CUDF Primer Concepts", retrieved on Sep. 20, 2010 at <<http://www.mancoosi.org/cudf/primer/>>, Mancoosi, 2010, pp. 1-3.

Di Cosmo, et al., "Package Upgrades in FOSS Distributions: Details and Challenges", retrieved on Sep. 20, 2010, Proceedings of Intl Workshop on Hot Topics in Software Upgrades (HotSWUp), Nashville, Tennessee, Oct. 20, 2008, pp. 1-5.

"FireScope Orchestrate Solutions", retrieved on Sep. 20, 2010 at <<http://www.firescope.com/Solutions/Orchestrate/Default.asp>>, FireScope, 2010, pp. 1-6.

"Introducing Microsoft System Center Operations Manager 2007 R2, White Paper", retrieved on Dec. 7, 2010 at <<http://search.microsoft.com/results.aspx?mkt=en-US&setlang=en-US&q=Introduction+to+System+Center+Service+Manager+&form=MSSBCUS>> Microsoft Corporation, May 2009, pp. 1-21.

McGlynn, "Accelerating Problem Resolution: Why It Matters and How to Do It", retrieved on Sep. 20, 2010 at <<http://www.itsmsolutions.com/newsletters/DITYvol5iss10.htm>>, itSM Solutions, DITY Weekly Newsletter, vol. 5.10, Mar. 11, 2010, pp. 1-3.

* cited by examiner

*Primary Examiner* — Van Nguyen
(74) *Attorney, Agent, or Firm* — Zete Law, P.L.L.C.; MacLane C. Key

(57) ABSTRACT

Managing groups of entities is described. In an embodiment an administrator manages operations on a plurality of entities by constructing a management scenario which defines tasks to be applied on a group of entities. In an example the management scenario includes information on dependencies between entities and information on entity attributes, for example operating system version or CPU usage. In an embodiment an entity management engine converts the tasks and dependencies in the scenario to a management plan. In an example the management plan is a list of operations and conditions to be respected in applying an operation to an entity. In an embodiment the plan can be validated to ensure there are no conflicts. In an embodiment the entity management engine also comprises a scheduler which runs tasks contained in the plan and monitors their outcome.

19 Claims, 10 Drawing Sheets

| Atomic task id | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Operation | Firmware update | | | | | | | | Application update | | | | | | | |
| Robot type | Non-critical, mobile | | Non-critical, immobile | | Critical | | IP range | | Non-critical, mobile | | Non-critical, immobile | | Critical | | IP range | |
| Robot id | 1 | 2 | 3 | 4 | 5 | 6 | 7 | 8 | 1 | 2 | 3 | 4 | 5 | 6 | 7 | 8 |
| Dynamic filter | CPU < 50% | | | | | | | | | | | | | | | |
| Timeout | 1 hour | | | | | | | | | | | | | | | |

FIG. 6

| Task id | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| Contained atomic tasks | 1 | 2 | 3 | 4 | 5 | 6 | 7 | 8 | 9 | 10 | 11 | 12 | 13 | 14 | 15 | 16 | 1 2 | 3 4 | 5 6 | 7 8 | 9 10 | 11 12 | 13 14 | 15 16 |

FIG. 7

| Operation | Firmware update | | | | | | | | Application update | | | | | | | |
|---|---|---|---|---|---|---|---|---|---|---|---|---|---|---|---|---|
| Robot id | 1 | 2 | 3 | 4 | 5 | 6 | 7 | 8 | 1 | 2 | 3 | 4 | 5 | 6 | 7 | 8 |
| Atomic task id | 1 | 2 | 3 | 4 | 5 | 6 | 7 | 8 | 9 | 10 | 11 | 12 | 13 | 14 | 15 | 16 |
| 1 | | | Y | Y | Y | Y | Y | Y | Y | | Y | Y | Y | Y | Y | Y |
| 2 | | | Y | Y | Y | Y | Y | Y | | Y | Y | Y | Y | Y | Y | Y |
| 3 | | | | | Y | Y | Y | Y | | | | Y | Y | Y | Y | Y |
| 4 | | | | | Y | Y | Y | Y | | | | | Y | Y | Y | Y |
| 5 | | | | | | | Y | Y | | | | | Y | | Y | Y |
| 6 | | | | | | | Y | Y | | | | | | Y | Y | Y |
| 7 | | | | | | | | | | | | | | | Y | |
| 8 | | | | | | | | | | | | | | | | Y |
| 9 | | | | | | | | | | | Y | Y | Y | Y | Y | Y |
| 10 | | | | | | | | | | | Y | Y | Y | Y | Y | Y |
| 11 | | | | | | | | | | | | | Y | Y | Y | Y |
| 12 | | | | | | | | | | | | | Y | Y | Y | Y |
| 13 | | | | | | | | | | | | | | | Y | Y |
| 14 | | | | | | | | | | | | | | | Y | Y |
| 15 | | | | | | | | | | | | | | | | |
| 16 | | | | | | | | | | | | | | | | |

FIG. 8

MANAGING GROUPS OF COMPUTING ENTITIES

BACKGROUND

Managing groups of computing entities such as servers in a server farm, networked computing entities at an Enterprise, collections of embedded entities such as printers, household appliances, medical equipment at a hospital and other collections of computing entities is typically done by one or more administrators in a semi-manual manner. For example, to install a new software upgrade at servers in a server farm an administrator carries out management operations on each server in turn. The administrator uses his or her expertise to carry out the upgrades and the process is time consuming and complex. Administrators are typically required to use their own expertise to manually schedule and launch management operations in an appropriate order. For example the management operations may be to apply a system update, reboot a particular entity, to load a new software component to all machines in a manufacturing process or other similar operations.

The embodiments described below are not limited to implementations which solve any or all of the disadvantages of known systems for managing groups of computing entities.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Managing groups of computing entities is described. In an embodiment an administrator manages operations on a plurality of entities by constructing a management scenario which defines tasks to be applied on a group of entities. In an example the management scenario includes information on dependencies between entities and information on entity attributes, for example operating system version or CPU usage. In an embodiment an entity management engine converts the tasks and dependencies in the scenario to a management plan. In an example the management plan is a list of operations and conditions to be respected in applying an operation to an entity. In an embodiment the plan can be validated to ensure there are no conflicts. In an embodiment the entity management engine also comprises a scheduler which runs tasks contained in the plan and monitors their outcome.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 6 is an example table of atomic tasks;

FIG. 7 is an example table of atomic tasks with success conditions;

FIG. 8 is an example table of ordering relations for atomic tasks;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an entity relationship management system, the system described is provided as an example and not a limitation. As those skilled in the art will appreciate, the present examples are suitable for application in a variety of different types of relationship management systems.

A group of computing entities is two or more computing-based entities where each entity has an operating system and may be any type of computing based entity. A non-exhaustive list of examples of computing-based entities is: personal computer, embedded entity, virtual machine, server.

A non-exhaustive list of examples of management operations is: software or hardware monitoring operation, network set up or an update sent directly to an entity such as installation of a piece of software, a patch, a library or a whole image.

Figure 1:
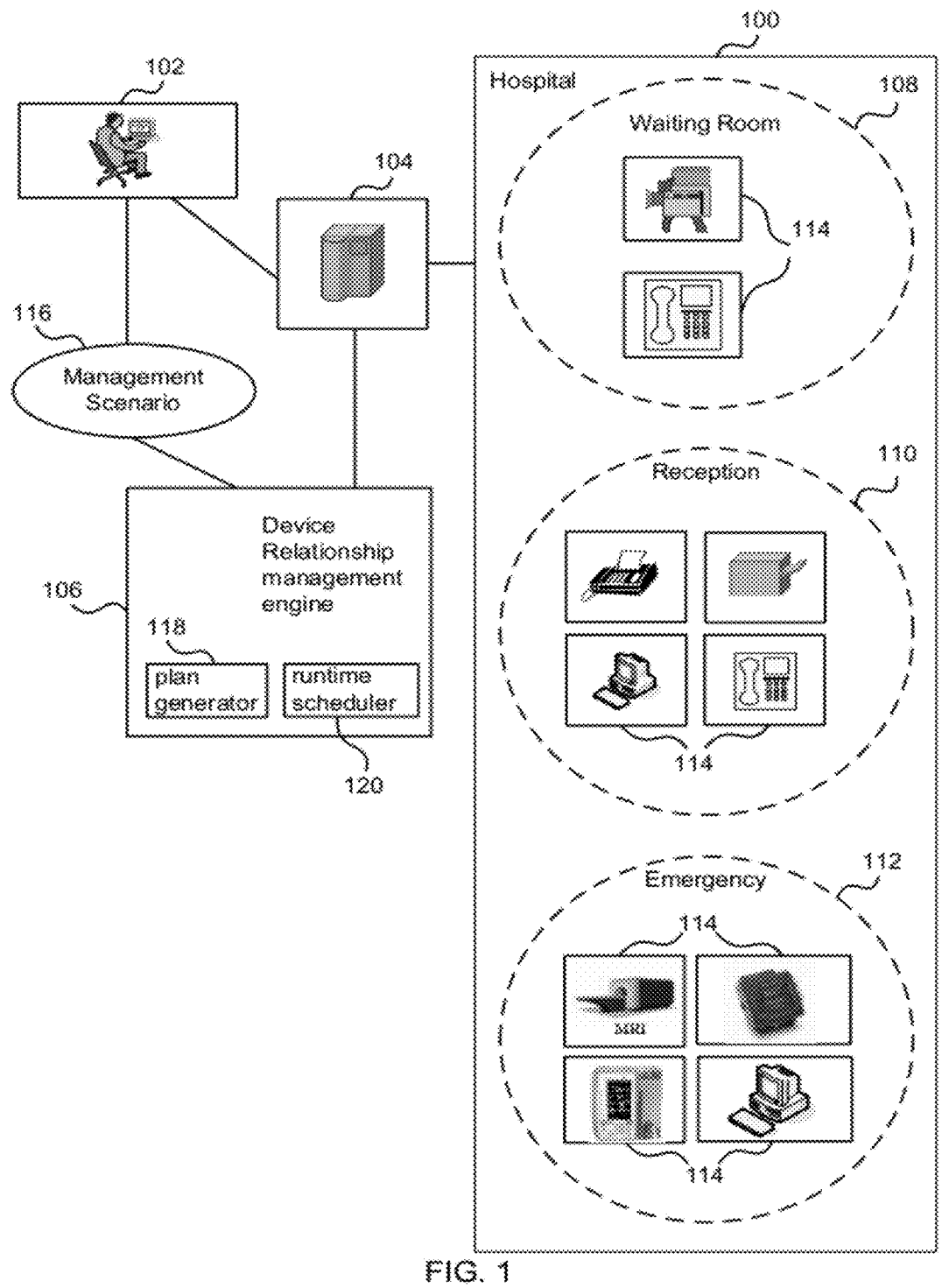
FIG. 1 is a schematic diagram of an example system for managing groups of entities.

FIG. 1 is a schematic diagram of an example system for managing groups of entities. In this example a plurality of entities are located in a hospital 100, however the entities may be in any appropriate location, for example, a data centre, school, library, university or office. The entities can be grouped according to their location. For example a first group 108 of entities is located in the waiting room, a second group of entities 110 is located in the reception and a third group of entities is located in the emergency room 112. In another example the entities 114 may be grouped according to their level of criticality. For example a camera and a phone located in the waiting room are less likely to be critical than an MRI scanner or a heart monitor in the emergency room.

The level of heterogeneity of entities and entity operations in, for example, a hospital 100 makes management of the entities difficult. A wide range of computing based entities 100 may be found in a hospital, for example; cameras, telephones, printers, fax machines, personal computers, MRI scanners or heart monitors. Often an administrator 102 who wishes to define a management operation, for example sending a security update, sends the update to each entity under their control individually which may be very time consuming.

The administrator may group entities according to operating system or operating system version. However, there are no semantics associated with such a collection and management operations are carried out on each machine in turn, disregarding the dependencies between machines. For example, an administrator may first update a non-critical entity in the waiting room and then wait for a period of time to see how the update performs before updating more critical systems in the emergency room individually.

In the embodiments described herein entities can be grouped according to a specific function. Custom semantics are created for groupings in order to constrain a management scenario 116 as to how an update should be carried out prior to committing a management operation. For example entities may be dependent on one another, constrained by the environment or by the applications run on them. These dependencies and constraints can be expressed in a processable format so that the management servers can process and resolve them.

For example an administrator 102 may wish to apply an update to fix a recurring critical error on a plurality of entities 114. The administrator 102 may wish to roll out the fix incrementally, so that entities with a lower level of criticality, for example a waiting room camera, is updated first so that any problems with the update can be detected before entities with a higher level of criticality, for example a magnetic resonance imaging (MRI) scanner, are upgraded.

In another example an administrator 102 may wish to ensure that a firmware update is correctly applied before applying an application update. In this example the two updates must be applied in order, if and only if the firmware update is correctly applied is the application update applied. In another example some of the entities 114 are virtual entities and an administrator 102 may wish to apply updates to any physical entities before applying the update to the virtual entities.

The administrator 102 can create a management scenario 116. The management scenario 116 is expressed in a language which is implicit and precise when expressing the dependencies between entities and success criteria for the application of a management operation. The management scenario comprises; a list of tasks to perform, dependencies between tasks and timing information. A task can comprise one or a list of several entities and a management operation to be performed on those entities. Dependencies can be defined based on static entities properties, for example "apply updates on version 1 entities before version 2 entities", dynamic properties, for example "apply update when process x is not running on entity y" and synchronization dependencies, for example "update A and update B start at the same time". Timing information may be a timescale for successful completion of the management operation. Specifying dependencies between entities provides administrators with additional control as to how management operations are carried out and increases the efficiency of managing updates. Management operations can be easily scaled to large numbers of entities rather than carried out on each entity individually.

The management scenario 116 can express, in a non-exhaustive list of examples; ordering among entities, priorities among operations, synchronization, resource constraints and entity attributes. Ordering among entities enables administrators to express the order in which management operations have to occur, for example, "manage entity a, then entity b, then entity c". Expressing priorities among operations enables administrators to express the pre-requisite and post-requisite actions, for example "application update must precede firmware update". Synchronization enables administrators to define common starting points and criteria of success for specific updates. Resource constraints enable administrators to express the requirements in the form of a dynamic dependency as described above. Entity attributes allow administrators to specify management operations according to those entity attributes, for example "update virtual machines last".

The user defined management scenario 116 is input into an entity relationship management engine 106 which is executed at a management server 104. The entity relationship management engine comprises a plan generator 118 and a runtime scheduler 120. The plan generator 118 computes and validates a management plan from the management scenario. In an example the plan generator can be a dependency resolver which resolves dependencies between tasks in the management scenario. The runtime scheduler runs the tasks contained in the plan and monitors their outcome making sure that all conditions specified in the plan are respected.

Figure 2:
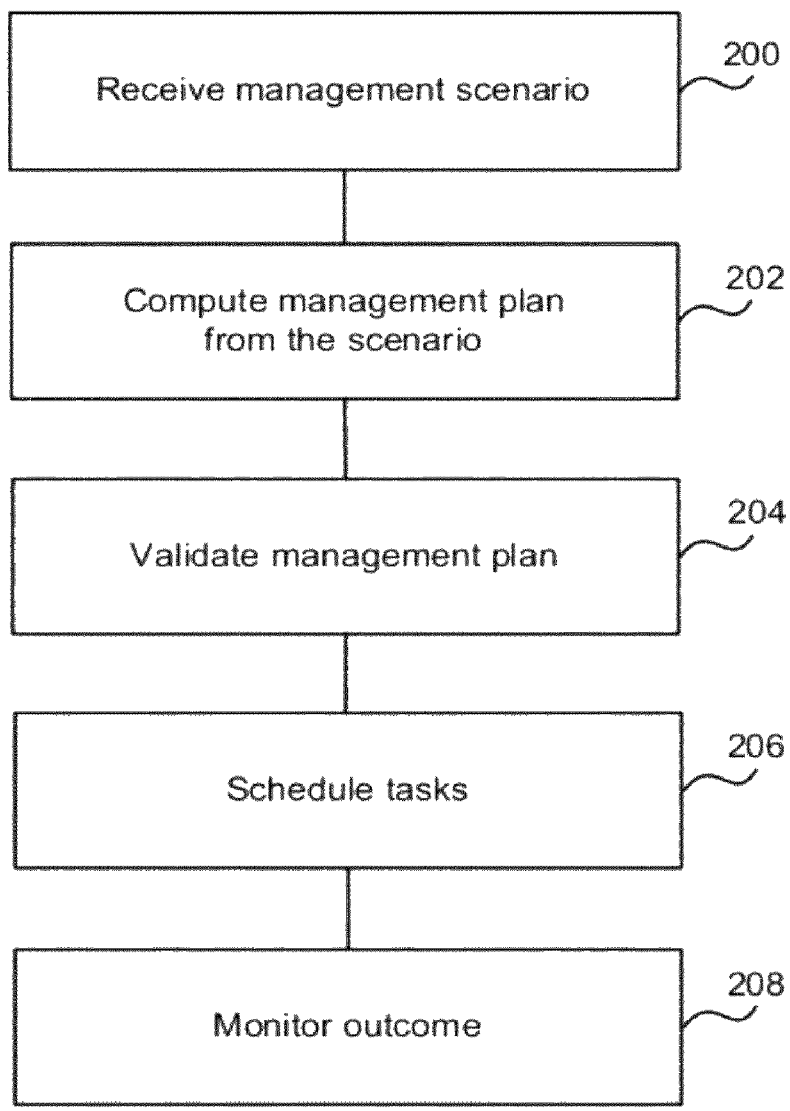
FIG. 2 is a flow diagram of an example method at an relationship management engine.

FIG. 2 is a flow diagram of an example method at an entity relationship management engine. A management scenario is received 200 which specifies tasks and optionally dependencies and timing information. The plan generator 118 computes 202 a management plan from the scenario. The management plan represents the information from the scenario (e,g. tasks and dependencies) in a more explicit form which is suitable for input into a runtime scheduler 120. Computing the management plan from the management scenario is described in more detail with reference to FIG. 4.

The plan may be validated 204 by carrying out safety checks. In an example validation may comprise carrying out checks to ensure no ordering conflicts exist. Processing and validation of a management scenario is described in more detail with reference to FIG. 5-8.

Tasks in the computed management plan are scheduled 206 by the runtime scheduler 120. The runtime scheduler executes the tasks and monitors 208 the outcome to ensure that all pre and post conditions set up by the administrator are respected. An example method of executing tasks at the runtime scheduler is described with reference to FIG. 9.

Figure 3:
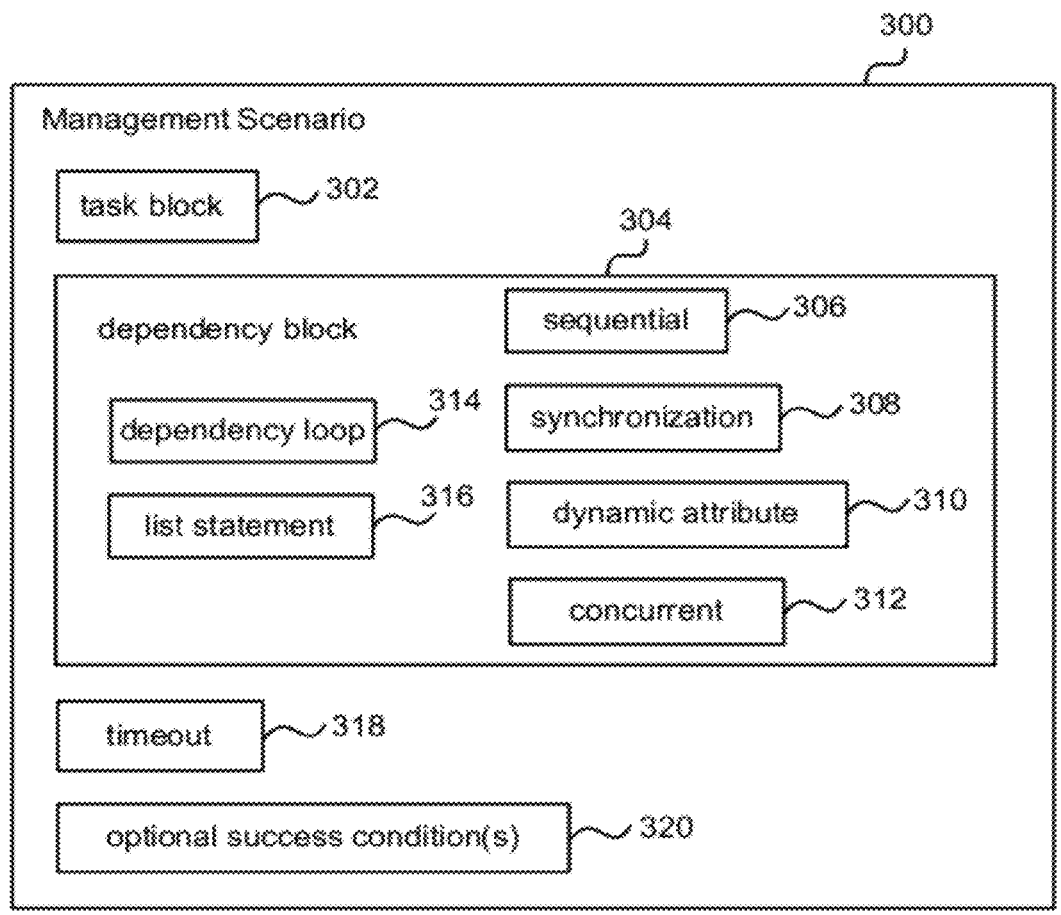
FIG. 3 is a schematic diagram of an example management scenario.

FIG. 3 is a schematic diagram of an example management scenario. A management scenario 300 can be specified by the user at a user interface. The interface may be a graphical user interface or a text based interface. The syntax allows multiple entity management scenarios to be expressed in a succinct way, allowing scaling to a very large number of managed entities.

The management scenario 300 comprises a task block 302 and optionally one or more dependency blocks 304. A dependency block comprises one or more dependency statements which may be one or more of a sequential dependency 306, a synchronization dependency 308, a dynamic attribute dependency 310, a concurrent dependency 312, a dependency loop 314 and a list statement 316.

The management scenario may optionally include timeout 318 details and one or more success conditions 320. If no timeout is specified in the management scenario then a default timeout may be used. In an example where a timeout 318 is specified by the user all tasks in the scenario have their timeout set to the given duration. In another example where the timeout 318 is specified by the user different tasks may have timeouts of different durations. A success condition 320 may be that the task completes within the timeout interval. Another example of a success condition 320 is that a certain percentage of all tasks complete within a specified period.

In an example a management scenario may be expressed in Backus-Naur Form (BNF) format as now shown, where bold characters are language reserved words:

```
<management scenario>::=
    tasks <task block>
    [dependencies <dependency block>] //optional; there may be no
    dependencies
    default timeout <duration>
    [timeouts <list of timeouts>] //optional, if missing the default timeout
    applies
```

Here square brackets are used to denote optional items which in this case are the dependencies and timeouts. The double forward slashes are used to indicate comments as opposed to functional parts of the management scenario.

The task block 302 states which tasks are to be performed. It comprises one or more task statements. A task statement may be a single atomic task, i.e. one management operation applied to one entity, or a task loop which applies a task to a plurality of entities, or a plurality of atomic tasks. A task block states which tasks are to be performed and the entities which the specified tasks are to be applied to. For example, using BNF format an example task block is now described.

```
<task block>::=(<task statement>+)// this explains that a task block is
formed from one or more task statements
<task statement.::=<task loop> | <task in task block>//this explains that a
task statement is either a task loop or a task
<task loop>::=foreach <id> in <list> {<task block>}//this gives the form
of a task loop
<task in task block>::=apply <operation> to <list of entities>//a task in the
task block may corresponds to an operation to be applied to a list of
entities
<operation>::=identifier of operation //an operation is identified by any
suitable identifier such as a string with name and arguments.
```

A management scenario may comprise one or more lists as mentioned above. A list, denoted in BNF in this document as <list> may be a list of attributes, a list of tasks, a list of entities, or a list of sequential items. A sequential item is a task with a specified success condition and a specified wait time to elapse after successful completion of that task before commencing the next sequential item in a list of sequential items. In an example a list of attributes may be either an explicit enumeration of one or more attributes, a range of attributes, or a list variable. A list of sequential items may be an explicit enumeration of one or more sequential items or it may be a list variable. A list of tasks may be an explicit enumeration of one or more tasks in a dependency block or it may be a list variable. A list of entities may be either an explicit enumeration of one or more entities, or specification of criteria to select entities using a filter, or a list variable. In the case that a list of entities comprises criteria to select entities using a filter then the filter <filter> may be any well formed expression comprising one or more of: attribute names, constants (e.g. numbers, true, false), logical operators and predicates. For example the predicate running P is true when process P is running on an entity. An example of a filter is RAM>1024. Another example of a filter is IP=123.45.6.7. In an example, the filter "true" is satisfied by all entities.

In BNF lists may be expressed as:

```
<lists>::= <list of attributes> | <list of tasks> <list of entities> | <list of
sequential items>//this explains that a list may be a list of attributes, tasks,
entities or sequential items.
<list of attributes> ::= [<id>+] | [<id>..<id>] <list-var> // Here square
brackets are part of the language rather than stating optional constructs.
```

This explains that a list of attributes may comprise an explicit enumeration, a range of attributes or a variable.

```
<list of tasks> ::= [<task in dependency block>+] | <list-var>
<list of sequential items> ::= [<sequential item>+] | <list-var>
<list of entities> ::= (<entities>+) | select entities where <filter> |
<list-var> //This explains that a list of entities may comprise an explicit
enumeration, a range of entities or a variable.
entity > ::= identifier of entity (e.g. constant or iterator variable)
```

List declarations and push backs may be defined for lists of tasks. These constructs are used in a management scenario to express succinctly a large collection of clusters of entities without the need to list all clusters explicitly. For example:

```
<list statement> ::= list <list-var>// this declares a list and initializes it to
an empty list.
<list statement> ::= pushback <list-var><id> // this appends a new element
to a list. Here <list-var> is a variable symbol that may be declared with
"list <list-var>" and <id> identifies an element, for example a task in a
dependency block, which will be appended to the list.
```

A management scenario may comprise zero, one or more dependency blocks as mentioned above. A dependency block 304 comprises one or more dependency statements where a dependency statement may be a dependency loop, a list statement, a sequential dependency, a dynamic attribute dependency, a synchronization dependency or a concurrent dependency. For example using BNF format:

```
<dependency block>::=(<dependency statement>)+
<dependency statement> ::= <dependency loop> | <list statement> |
<sequential dependency> | <dynamic attribute dependency> |
<synchronization dependency> | < concurrent dependency>
<dependency loop> ::= foreach <id> in <list> {<dependency-block>}
<sequential dependency> ::= respect ordering <list of sequential items>
<sequential item> ::= <task> [success condition <condition>] [wait
<duration> after completion]
```

The semantics of a sequential or ordering dependency 306 are "perform each task in the list in order". For example, the order may be the order specified by the list. An amount of time may be specified by <duration> which may be a time that the runtime scheduler is to wait before moving to the next task. The duration may be expressed by a date object in a pre-defined format, for example "1 week", "12 hours" etc. In an example, the default wait value is 0. In an example, the runtime scheduler is arranged so that the next task may start only when a success condition of the current task is fulfilled. For example, the next task could start when the current task is completed on 80% of entities. The success condition may have the form <number>% completed and states the minimum percentage of successful atomic tasks that are required to move on to the next iteration. In an example, a default success condition value is 100% however, more complicated expressions containing logical operators such as disjunction and conjunction may be used. It is not essential to use a success condition.

Where a dependency is a synchronization dependency 308 all tasks in the list are to start executing at the same time. For example each of the tasks may start only when the conditions of all of them are satisfied. An example of a synchronization dependency expressed in BNF format is;

<synchronization dependency::=synchronize<list of tasks>.

Where a dependency is a dynamic attribute dependency 310, for each entity in the task the operation can start running only when a dynamic filter is satisfied on that entity. If, on a particular entity, a timeout is reached before the dynamic filter is satisfied, the operation is marked as failed on that entity. For example;

<dynamic attribute dependency>::=<task> when <filter>.

Where a dependency is a concurrent dependency 312 it specifies that at most k tasks at a time are worked on. The k tasks can be processed in any order. If a success condition is evaluated as false then non of the remaining tasks are started. For example:

```
<dependency statement> :: = <concurrent dependency>
<concurrent dependency> ::= concurrently at most <integer value>(<list of tasks>) [next when <condition>]
```

Several examples of management scenarios are now given.

In an example where an administrator wishes to prioritize management operations such that all application updates follow firmware updates as described with reference to FIG. 1, the management scenario may be specified as;

```
tasks
    for each d in (select entities where true)
        apply firmware-update to d
        apply application-update to d
dependencies
    for each d in (select entities where true)
        respect ordering (
            (firmware-update, d)
            (application-update, d)
``` where the language reserved word "apply" applies an update and the language reserved words "respect ordering" enforces that the firmware update is applied before the application update. In this example, the task block comprises a task statement which is a task loop that applies operations to entities filtered according to criteria. The criteria used may be entity attributes for example and are not given in this example for clarity. In this example, a dependency block is present and it comprises a dependency statement which is a dependency loop. That dependency loop applies a sequential dependency which in this example is that firmware updates must be applied before application updates.

In another example an application update is sent to non-critical entities first. After it has been applied to non-critical entities the administrator may wish to wait for a period of time before the update is applied to critical entities in order to determine how the update is performing. A dependency block of a management scenario may be specified in this example as;

```
dependencies
    (respect-ordering
        (my-operation, (select entities where (critical=false), wait 1 week after completion
        (my-operation, (select entities where (critical=true))
```

In this example a sequential dependency is used to apply the application update (called my-operation in this example). A filter is used to select critical entities. This illustrates how entity attributes such as critical/non-critical may be used.

In another example an administrator requires to prioritize according to entity physical and virtual characteristics. Suppose an application update is to be sent to entities that have more than 1 GB of RAM. In this case an example task block is:

```
tasks
    foreach (d in (select entities where (RAM > 1024)))
        apply application-update to d
```

This example illustrates how a filter may be used in the task block to select entities with particular attributes. In some example, the entity attributed may be dynamic such as available CPU.

In another example, an administrator requires to carry out a management operation only where entities are not running a particular process. This is possible by using a task block comprising:

```
foreach d in (select entities where true)
    (upgrade-operation, d) when (not (running x)).
```

In this example whether an entity is running process x is an example of a dynamic entity attribute.

In an example where an administrator wants to send a security update to a server farm composed of clusters of servers, the administrator can define the order in which the security update will be performed. For example, the administrator applies a success condition so that at least 80% of the machines in each cluster are to be updated before the next cluster update may begin. An example dependency block of a management scenario may comprise

```
list mylist // declare a new variable
foreach id in [1..100]
    pushback mylist (security-update, (select entities where clustered-id),
    success condition 80% completed) //append new element (sequential item) to list
respect ordering mylist
```

This example, illustrates the use of list declarations and pushbacks to create lists of sequential tasks with success conditions. A variable mylist is declared for a list of tasks. This list is populated by looping through 100 clusters (in this example) and adding tasks to the list as sequential items. Each task added is the task of applying the security update to entities in the cluster with a success condition that 80% of the entities in that cluster have successfully had the security update applied. The order of the tasks in mylist is then enforced using a sequential dependency statement "respect ordering mylist".

Figure 4:
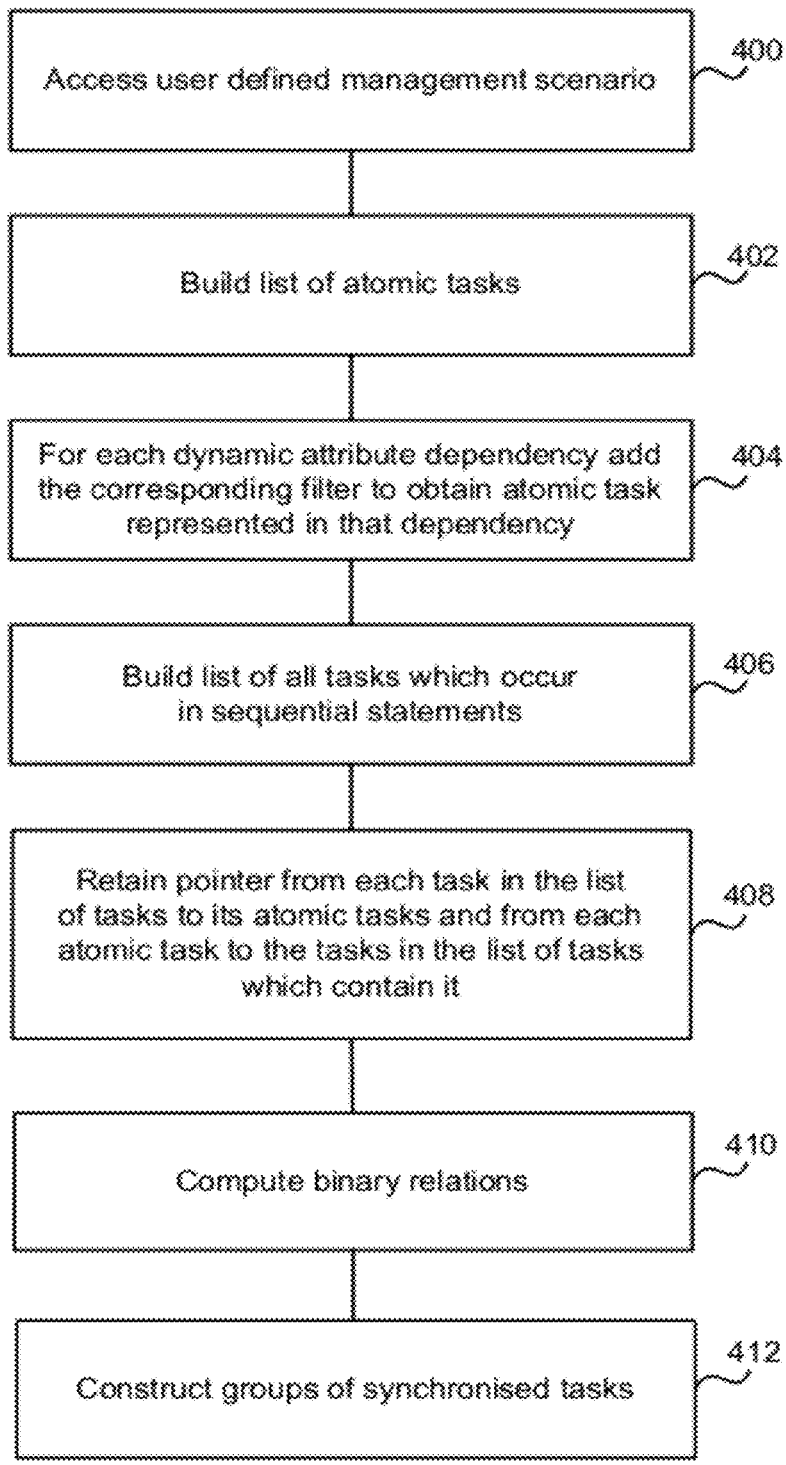
FIG. 4 is a flow diagram of an example method of computing a management plan.

FIG. 4 is a flow diagram of an example method of computing a management plan. As described above with reference to FIG. 2 a management scenario is received by an entity relationship management engine executed at the management server. The plan generator 118 accesses 400 the user defined management scenario and computes and validates a management plan. The management plan represents information from the management scenario with atomic tasks and more explicit dependencies. In an example the plan is a structure where P=(δ, ~, <, G, T, €), and the symbol δ represents a list of atomic tasks, ~ is a list of binary synchronization relation between atomic tasks, < is a list of ordering binary relations between atomic tasks, G is a collection of groups of synchronized atomic tasks, T is a list of high level (non-atomic) tasks that occur in sequential statements (also referred to as tasks with success conditions (TSCs)) and € is a list of ordering binary relations between tasks in T.

The list of atomic tasks ε is built 402 by expanding into atomic tasks the task lists in the management scenario introduced by the tasks keyword. A copy of each atomic task is kept. An atomic task is a pair comprising an entity and a management operation to be applied to the entity. Each atomic task may have a dynamic filter (obtained from any dynamic attribute dependency statements) and a timeout threshold. Each atomic task belongs to zero or more tasks from T.

The process of forming the management plan comprises, for each of the dynamic attribute dependencies, add 404 the corresponding filter to each atomic task represented in that dependency.

As mentioned above ~ is a list of synchronization binary relationships between atomic tasks. In an example if two atomic tasks a and b are contained within the same synchronization statement, after all tasks in the synchronization statement have been expanded into atomic tasks then the relation between the tasks is defined as a~b. For each atomic task a the relation a~a holds as well. ~ can be extended to it's transitive closure.

Transitive closure computation can be carried out using, for example, a graph analysis algorithm for finding the shortest points in a weighted graph in order. For example a bi-dimensional table T_ can be computed which is a list of tasks and their synchronization relations. Examples of graph analysis algorithms are the Floyd-Warshall algorithm and Repeated matrix Multiplication. However, any suitable graph analysis algorithm may be used.

Ordering binary relations between atomic tasks are represented by <. Given two atomic tasks a and b, if there are two tasks u and v, such that aεu and bεv and such that u€ v, a relationship a ≺ b can be defined. The ordering relation < can be obtained by combining ≺ and ~ and by computing the transitive closure. An ordering binary relation a<b states that the activation condition of atomic task b depends directly on the success or failure of atomic task a, therefore the runtime scheduling algorithm should schedule a earlier than b.

T is a list of all tasks that occur in sequential statements 406. Tasks from sequential dependencies are tracked as they have success conditions which need to be evaluated for a task seen as a group of atomic tasks (e.g. the task succeeds when 80% of the contained atomic tasks succeed) There is no need to keep track of other non-atomic tasks in the management plan (such as those present in a dynamic attribute dependency) as the information they contain will be passed on to the level of atomic tasks. There is an ordering binary relation € between tasks in T which are high level, non-atomic tasks. For example for two tasks u and v, if u comes before v in a sequential statement then u€ v.

In an embodiment all tasks that belong to concurrent dependencies can also be added to T. In an example a concurrent dependency statement allows the performance of at most one task at a time (1-concurrency). This requires performing the tasks in order without imposing a specific ordering a priori. A 1-concurrency is therefore similar to a sequential statement except that in the former an actual ordering € of the tasks is decided dynamically at the execution time.

New ordering binary relations € between tasks in T introduce new ordering binary < relations between atomic tasks according to the definitions of ≺ and <.

The process of forming the management plan involves retaining 408 pointers from each task in the list of tasks T to that task's atomic tasks; and from each atomic task to the tasks in the list of tasks T which contain that atomic task. The binary relations: synchronization binary relation ~ between atomic tasks, ordering binary relation < between atomic tasks, and ordering binary relation € between tasks with success conditions are computed 410. In an example, this may be achieved by forming table data structures and populating those with true/false values as described in more detail below. However, it is not essential to use table data structure in this way any suitable data structure can be used to represent binary relations between tasks Other types of data structures or methods of computing the binary relations may be used.

Groups of synchronized tasks G are constructed 412. A group of synchronized tasks is a maximal set of atomic tasks that are synchronized with each other as a result of synchronization dependencies in the original management scenario. If the synchronization binary relations ~ between the atomic tasks are represented as a graph for example, each element in G is one connected component of the graph. Once a plan has been constructed from the management scenario it is possible to validate the plan to ensure that there are no scheduling conflicts.

A pseudo code example of an algorithm for computing a management plan is now given. In this example, a management scenario is provided as input and has the following structure.

Management scenario S=(u, Ω, Δ, Σ), comprises a list of tasks u, a list of ordering dependencies between tasks Ω, a list of dynamic attribute dependencies Δ, and a list of synchronization dependencies Σ. For clarity in this example Δ contains not only dynamic filters but also timeout information, even though in at least some examples these two types of information are provided with separate statements.

```
Plan Computation Algorithm
  {Input: S, a management scenario; Output: P, a plan structure}
  𝒮 ← BuildAtomicTasks(U)
  AttachDynamicFilterInfo(𝒮 ,Δ)
  T_~← BuildATSynchronizationTable(𝒮 ,Σ) {build the ~ relation
as a bi-dimensional table (matrix)}
  𝒢 ← BuildSynchronizationGroups(T_~)
  𝒯 ← BuildTasksWithSuccessCondition(Ω)
  T_≼ ← BuildTOrderingTable (𝒯 ,Ω) {build the ≼ relation as a bi-
dimensional table)
  T_< ← BuildATOrderingTable (T_~ [(,T)]_≼ ,) {build the <
relation as a bi-dimensional table}
return P=(𝒮 ,T_~,T_<,𝒢 ,𝒯 ,T_≼ )
```

The first step of the plan computation algorithm is computing the list of atomic tasks S. A BuildAtomicTasks procedure (as shown below) expands all tasks into atomic tasks and keeps one copy of each atomic task. Each atomic task may have a dynamic filter and a timeout threshold. These may be obtained as detailed in the below example pseudo code of the AttachDynamicFilterInfo method:

The next step of the plan computation algorithm uses the BuildATSynchronizationTable to calculate the synchronization binary relation between atomic tasks. This is done by forming a bi-dimensional table, matrix or grid and initializing all the table cells to false. For example, the table has a column for each atomic task and a row for each atomic task. Table cells are marked true if a binary synchronization relation exists for the pair of atomic tasks indexed by that cell. The synchronization relations are found from the synchronization dependencies of the management scenario and also by computing transitive closure using the Floyd-Warshall algorithm or similar process. A pseudo code example is given below for this procedure. As soon as this atomic task synchronization table is formed and populated then they synchronization groups, which are connected components in a graph of the synchronization relation may be computed. Pseudo code for an example BuildSynchroizationGroups method is given below.

A list of tasks with success conditions is then built. This is done by creating a list of all tasks that appear in a sequential dependency and by giving each task a unique id. Pseudo code for an example BuildTasksWithSuccessCondition method is given below.

In order to find the ordering binary relation between tasks with success conditions a table is built, for example, using a BuildTOrderingTable process mentioned above in the plan computation algorithm. This process comprises forming a bi-dimensional table, grid or matrix data structure with one column for each task with success condition and one row for each task with success condition. The cells of the data structure are initialized to false. A cell is marked true if the two tasks indexed by the cell appear in the order specified by the cell index in a sequential dependency received from the management scenario. Propagation to transitive closure is computed using the Floyd-Warshall algorithm or similar.

In order to find the ordering binary relation between atomic tasks a table may be built, for example, using a BuildATOrderingTable process mentioned above in the plan computation algorithm. This process comprises forming a bi-dimensional table, grid or matrix data structure with one column for each atomic tasks and one row for each atomic task. The cells of the data structure are initialized to false. A cell is marked true according to a two step process. Mark a cell true if the atomic tasks it indexes (a, b) have the property: $\exists u, v \in T$ such that $u<v$ and $a \in u$, $b \in v$. Then, set $a<b$ for all pairs with the property that:

there exists an atomic task c such that a~c and c<b; or
there exists an atomic task c such that a~c and c~b.

As before, propagation to transitive closure is computed using the Floyd-Warshall algorithm.

In an example nested loops may be use to compute the plan. In another example only the TRUE results may be recorded. Only recording the TRUE results may potentially lead to reduced memory usage in an example where less than half the total possible result set is TRUE.

```
BuildAtomicTasks Method
  {Input: U, a list of tasks; Output: S, a list of atomic tasks}
S ← ∅
  for all u ∈ U do
    A ← GroundTasks(u)
    for all a ∈ A do
    if a ∉ S then
    a → S  {add new atomic task to list}
        give a unique id to a (e.g., its position in S }
    {do the next operation on the copy of a stored in S }
    add u to τ(a), the list of tasks that contain a
  return S
AttachDynamicFilterInfo Method
  {Input: Δ, a list of tasks; Modified: S, a list of atomic tasks}
  for all u ∈ Δ do
  A ← GroundTasks(u)
  for all a ∈ A ∩ S do
      {do the next operation on the copy of a stored in S }
      attach to a timeout and dynamic filter info from u (technically the
      timeout could be expressed elsewhere, not in the same place with
      dynamic filters...}
  BuildATSynchronizationTable Method
    {Input: S, Σ, a list of atomic tasks and a list of synchronization
dependencies; Output: T_~, a bi-dimensional table representing a binary relation}
    {stage1 - initialization}
    set all records of T_~ to false
    for all synchronization statements S ∈ Σ do
    A ← S ∩ GroundTask(s)
    for all pairs (a,b) ∈ A × A do
    let i,j be the unique ids of a,b respectively
    T_~[i,j] ← true
    {stage2 - propagate to transitive closure with Floyd-Warshall
algorithm}
    for all k ← 1.. |S| do
      for all i ← 1.. |S| do
        for all j ← 1.. |S| do
            T_~[i,j] ← T_~[i,j] ∨ (T_~[i,k] ∧ ((T)]_~[k,j])
    BuildSynchronizationGroups Method
    {Input: T_~, a bi-dimensional table representing a binary relation;
Output: G, the list of connected components of the graph induced by T_~}
G ← ∅
for all i ← 1.. |S| do {iterate through all atomic task ids}
    if ∃G ∈ G, ∃j ∈ G such that T_~[i,j]= true then
        i → G {add this task id to G}
    else
        create new group G and add it to G
```

-continued

```
        i→G {add this task id to G}
        BuildTasksWithSuccessCondition Method
           {Input: Ω, a list of ordering dependencies; Output: 𝓕, a list of
TSCs}
𝓕 ← ∅
for all ω∈ Ω do // for each ordering dependency
     // assume that each ordered item in the ordering dependency contains one
     task for all t∈ω do // for each such a task
           t→𝓕 {add task (together with success cond and wait interval) to list
           of TSCs}
return𝓕
        GroundTasks Method
           {Input: V, a list of tasks (or possibly just one task); Output: A, a list
of atomic tasks that appear in V}
A←∅
for all u∈V do
     for all devices d∈u do
           a←(d,o) {o is the management operation of task u}
           if a∉A then
                 a→A {add new atomic task to list}
returnA
```

Figure 5:
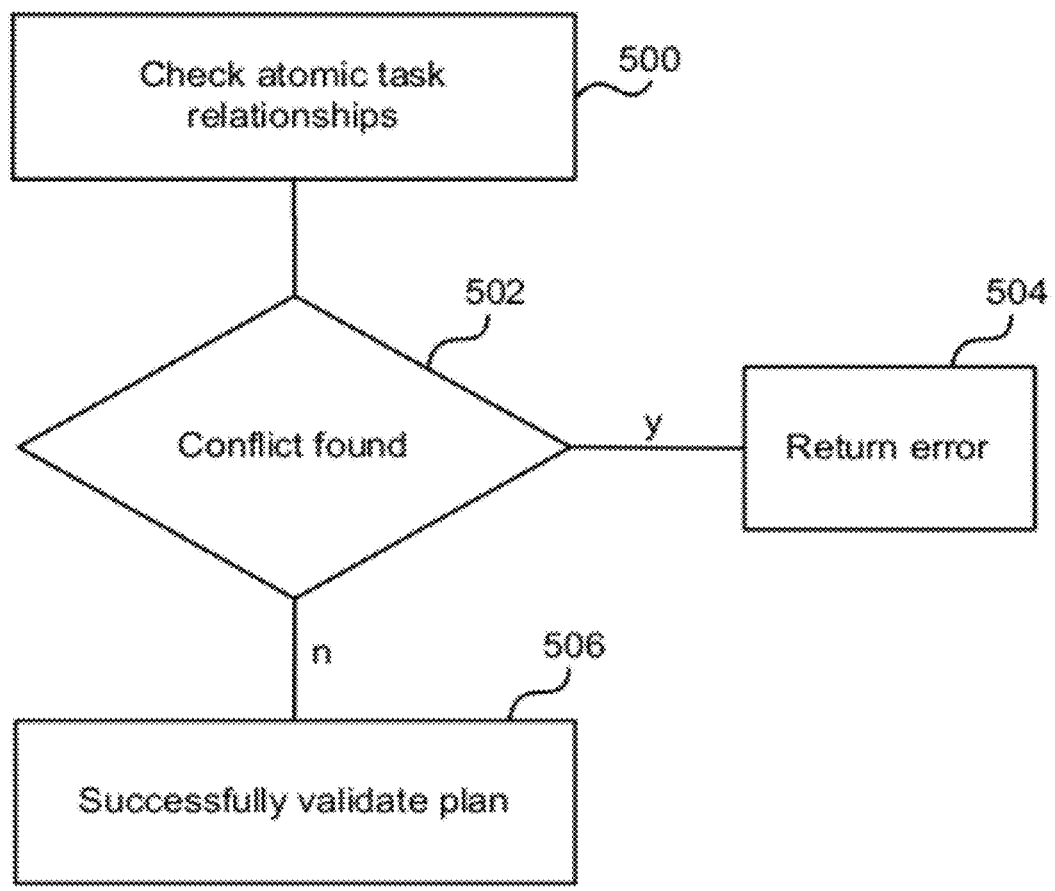
FIG. 5 is a flow diagram of an example method of plan validation.

FIG. 5 is a flow diagram of an example method of plan validation. The atomic tasks relationships in the computed plan are checked 500 for any conflicts. If a conflict in the ordering of the tasks is found 502 an error is returned 504. However, if no conflicts are found then the plan can be successfully validated 506.

In an example dependencies formulated in the management scenario could introduce cycles in the ordering of the tasks. For example tasks involved in such cycles could wait forever for each other to start leading to a deadlock in the execution of a management scenario. For example a sequential dependency could require that a start before b (where a and b are atomic tasks), whereas a synchronization dependency could require that a and b start at the same time. This would introduce a conflict in the ordering of the tasks. It is possible to check whether a conflict in the ordering of the tasks is present by checking whether the computed ordering binary relation < contains records of the type atomic task a<atomic task a.

In another example where a single 1-concurrency statement is used in a management scenario it is possible to check a priori whether there is an ordering of tasks that will not introduce an ordering conflict. For example if there is an a~b relation between two atomic tasks that belong to distinct tasks within the 1-concurrency statement then an error will be returned 504 as there is no conflict free ordering. Otherwise a local data structure T will be initialized to be the set of all tasks in the 1-concurrency statement. A task u∈T is searched for with the property that there are no incoming edges from any other task v∈T to u, where an edge exists between v and u if ∃a∈u, ∃b∈v:a<b. The backwards capital E notation means "there exists" and the epsilon notation means "is a member of". The notation : means "and". If no such task u exists then an error is returned 504. If one or more u exists that satisfies the condition then u can be selected arbitrarily. The process is repeated until T is empty. An error will only be returned if and only if all possible orderings of the tasks in the 1-concurrency statement will introduce an ordering conflict, otherwise the plan will be successfully validated 506.

In another example a plurality of 1-concurrency statements are independent if their sets of atomic tasks are disjunct and there are neither ~ nor < relations between the 1-concurrency statements. If all 1-concurrency statements are independent then checking for conflicts in the management scenario can be performed as described above for a single 1-concurrency statement and successful validation 506 can be carried out in polynomial time.

In an example an administrator wishes to apply an application update and a firmware update for a list of robots. The administrator can express the following requirements in a management scenario; that firmware updates are to precede application updates, all updates are to be carried out on non-critical mobile entities followed by non-critical immobile entities, followed by critical entities, followed by entities with IP range from 192.68.0.0. to 192.68.0.256 and a management operation can only be carried out when an entity's CPU is running at 50% of it's capacity. In this example a timeout of one hour is specified for each update operation although any suitable timeout may be used. An example of a management scenario which fulfils this criteria, expressed in BNF format, is given below. The task block comprises two apply statements:

```
apply firmware-update to (select entities where (robot = yes))
apply application-update to (select entities where (robot = yes))
Furthermore, there are a series of dependencies in a dependency block:
foreach d in (select entities where (robot = yes))
    respect ordering
        (firmware-update, d)
        (application-update, d)
respect ordering (
    (firmware-update, (select entities where (robot = yes and critical = false
    and mobile = true)))
    (firmware-update, (select entities where (robot = yes and critical = false
    and mobile = false)))
```

-continued

```
    (firmware-update, (select entities where (robot = yes and critical = true)))
    (firmware-update, (select entities where (robot = yes and IP >= 192.68.0.1
        and IP <= 192.68.0.256))))
foreach d in (select entities where (robot = yes))
    (firmware-update, d) when (CPU < .5)
        The last 2 statements are repeated, using "application-update" instead
of "firmware-update":
respect ordering (
    (application-update, (select entities where (robot = yes and critical = false
        and mobile = true)))
    (application-update, (select entities where (robot = yes and critical = false
        and mobile = false)))
    (application-update, (select entities where (robot = yes and critical = true)))
    (application-update, (select entities where (robot = yes and IP >=
        192.68.0.1 and IP <= 192.68.0.256))))
foreach d in (select entities where (robot = yes))
    (application-update, d) when (CPU < .5)
Finally, the default timeout threshold is set:
default timeout 1 hour
```

The scenario is converted into a plan. For example if there are eight robots which fall into four disjunct categories: robots 1 and 2 are non-critical and immobile; robots 3 and 4 are non-critical and mobile; robots 5 and 6 are critical; robots 7 and 8 match the filter (IP>=192.68.0.1 and IP<=192.68.0.256), as there are eight entities and two operations (e.g. application update and firmware update) there are sixteen atomic tasks in total. Each atomic task (robot i-application update) has its id set i, whereas atomic tasks (robot i-application update) have their id set to i+8. Dynamic filters, for example CPU<50% and timeout thresholds, for example 1 hour, are associated to atomic tasks as shown in FIG. 6. As there are no synchronization statements in this example the only records in the synchronization table are trivial pairs a~a. As a result there are 16 synchronization groups and each of them contains one atomic task.

FIG. 7 is an example table of atomic tasks with success conditions. Each task in a sequential dependency statement becomes an element in T, the set of tasks with a success condition. The ordering relation between the tasks is also defined. The example scenario described above contains three sequential statements. The first statement which is nested inside a for loop creates 16 tasks, each task containing precisely one atomic task. Each of these tasks is assigned the same id as its contained atomic task. The second sequential dependency statement contains 4 tasks. These tasks are assigned ids from 17 to 20 in the order they appear in the sequential statement. Each of these tasks contains two atomic tasks, for example;
(firmware-update, (select entities where (robot=yes and critical=false and mobile=true)))
creates a task that will contain atomic tasks with ids 1 and 2 (pairs (robot 1-firmware update) and (robot 2 firmware update)).

The last sequential dependency statement creates four more tasks in T, with ids from 21 to 24. Thus in this example there are 24 tasks contained in table T and the € relation has the following records;
(1,9), (2,10), (3,11), (4,12), (5,13), (6,14), (7,15), (8,16), introduced by the first sequential statement;
(17,18), (17,19), (17,20), (18,19), (18,20), (19,20), introduced by the second sequential statement;
(21,22), (21,23), (21,24), (22,23), (22,24), (23,24), introduced by the last sequential statement.

FIG. 8 is an example table of ordering relations for atomic tasks. Cells (i, j) marked with "Y" indicates an < relation between the atomic task with the id i and the one with the id j. The upper left corner is populated by the second sequential statement, whereas the third sequential statement adds the records in the bottom right quarter of the table. In the upper right corner, the main diagonal is introduced by the first sequential statement. The rest of the records in the upper right corner are the result of propagating transistivity through the table. Since the main diagonal contains no cell marked with "Y" the plan is verifiable in the example and the tasks can be scheduled by the runtime scheduler.

Figure 9:
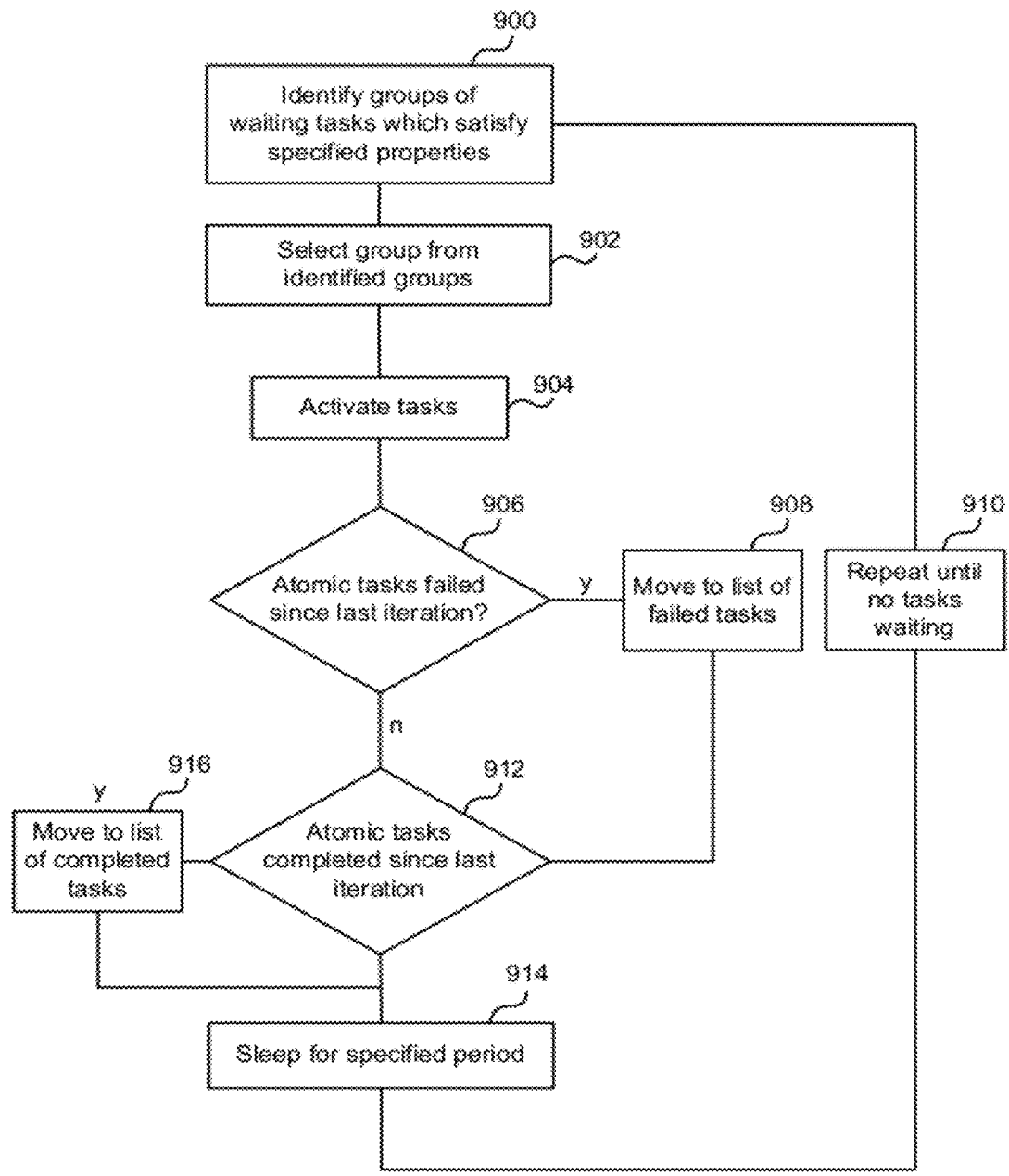
FIG. 9 is a flow diagram of an example method of scheduling tasks.

FIG. 9 is a flow diagram of an example method of scheduling tasks. After the management scenario is converted into a plan structure and tasks are verified as described above they are scheduled for execution by the runtime scheduler. In an example scheduling is dynamic, interleaving with the execution of tasks. At scheduling time, each atomic task can be in one of the following states; waiting for activation conditions to be satisfied, active, completed successfully, or failed. In an example checking the activation condition of an atomic task a comprises; if there exists a task u such that a∈u (that is, the atomic task a is a component or member of the task u) and there exists a task v for which a binary relation holds with u as follows: ∃v€ u, a cannot become active unless the success criterion of v holds, and the wait interval of v has passed. Atomic tasks that belong to a group of more than one synchronized atomic tasks can be activated only as a group, i.e, when all their activation conditions hold. In an example tasks have failed when one of three conditions holds; the current atomic task has timed out; the current atomic task has returned with an error code or the activation condition of an atomic task is invalidated. Activation conditions of an atomic task are invalidated if ∃u, v∈T:u€ v, a∈v and u's success condition has been evaluated to false. Less formally, activation conditions of an atomic task are invalidated if there exists a task u and a task v which are members of the list of tasks T which occur in sequential statements; and a binary relation holds between u and v as follows u€ v where atomic task a is a component of task v and u's success condition has been evaluated to false.

All tasks are initially in a waiting state. The runtime scheduler identifies 900 groups of waiting atomic tasks which satisfy specified properties. In an example the specified properties are; the activation conditions of the atomic tasks hold; the atomic tasks are synchronized; and all other atomic tasks synchronized with these (if any) are in a failed state because their activation conditions have been invalidated. A group of atomic tasks may be a single atomic task in some examples.

Where one or more groups of waiting tasks satisfy the specified properties a group is selected 902 and all atomic tasks in the group are made active 904. For each atomic task which becomes active a time-out clock can be started. In an embodiment each active atomic task checks its launching condition regularly. In an example the launching condition refers to the dynamic filters. For example when there is one or more synchronized tasks the launching condition holds when the conjunction of all tasks launching conditions hold. When the launching condition holds, the task starts running.

The runtime scheduler checks if any atomic task has failed 906 since the last iteration. In an example, if an atomic task a fails then the success criteria of every task u∈T that a is part of is re-evaluated. For example if the success criterion is 80%, then the failure of a may bring the percentage of failed atomic tasks in u to more than 20%. In an example when the success criterion of a task in u is evaluated to false the result can be propagated further. For example any atomic tasks that belong to v with the property u∈ v may be marked as failed because their activation conditions have been invalidated. Any tasks which have failed since the last iteration can be moved to a list of failed tasks 908.

The runtime scheduler can additionally check if any atomic task has completed 912 since the last iteration. When an atomic task completes the success criterion of every task u∈T that atomic task a is part of can be re-evaluated. In an example the success or failure of a task u is important in deciding the activation condition of atomic tasks v with the property u∈ v. Any task which has completed since the last iteration can be moved to the list of completed tasks 916. The runtime scheduler may sleep for a specified period 914 before performing another iteration. This will allow tasks time to fulfill their success or failure criteria. Iterations can be repeated 910 until there are no groups of tasks waiting to be activated.

In the example described above with reference to FIGS. 6-8 atomic tasks 1 and 2 do not have to wait for other atomic tasks, therefore their activation condition is satisfied from the beginning. The scheduler will activate both of the tasks during the first two iterations of the main loop in the scheduling algorithm. As soon as atomic task 1 completes the activation condition of atomic task 9 is satisfied. However, if atomic task 1 fails then all atomic tasks from 3 to 9 will eventually be marked as failed because their activation conditions become invalidated. Similarly, as soon as atomic task 2 completes the activation condition of atomic task 10 is satisfied. As soon as both atomic tasks 1 and 2 complete, the activation conditions of atomic tasks 3 and 4 will be satisfied. The algorithm can continue iterating until every task is marked completed or failed.

In an example, the entity relationship management engine provides a method of collectively managing a plurality of computing entities. A management scenario is received that has a task block stating tasks to be performed and specifying which of the computing entities the tasks are to be applied to. In this way a user is able to collectively manage lots of entities or lots of tasks to be applied to one entity. For example, the management scenario has a dependency block comprising at least one dependency statement to be applied to tasks from the task block, the at least one dependency statement being any of a sequential dependency statement, a dynamic attribute dependency statement, and a synchronization dependency statement; where a sequential dependency statement is a list of at least two tasks to be carried out in a specified order; where a synchronization dependency statement comprises a list of at least two tasks to be started at the same time; and where a dynamic attribute dependency statement comprises at least one task to be carried out on an entity only when a dynamic filter is satisfied on that entity. For example, there may be any combination of these different types of dependency statement. Concurrent dependency statements may also be used as mentioned earlier in the document. By using the dependency block a user is able to succinctly express conditions and requirements about how the tasks are to be applied to the entities. For example, loop statements and variables may be used as described above.

A plan generator computes a management plan from the management scenario, the management plan comprising a list of atomic tasks expanded from the tasks in the task block and also comprising binary relations between pairs of tasks calculated from the dependency statement(s) in the dependency block. There are various types of binary relations that may be calculated. Some of these may be used for ordering conflict checks and other validations of the management plan. Some of these may be used to control how the atomic tasks are executed by a runtime scheduler. For example, the management plan may be used to control execution of the tasks on the entities by scheduling the atomic tasks in a manner which takes into account at least some of the binary relations calculated from the dependency statement.

Figure 10:
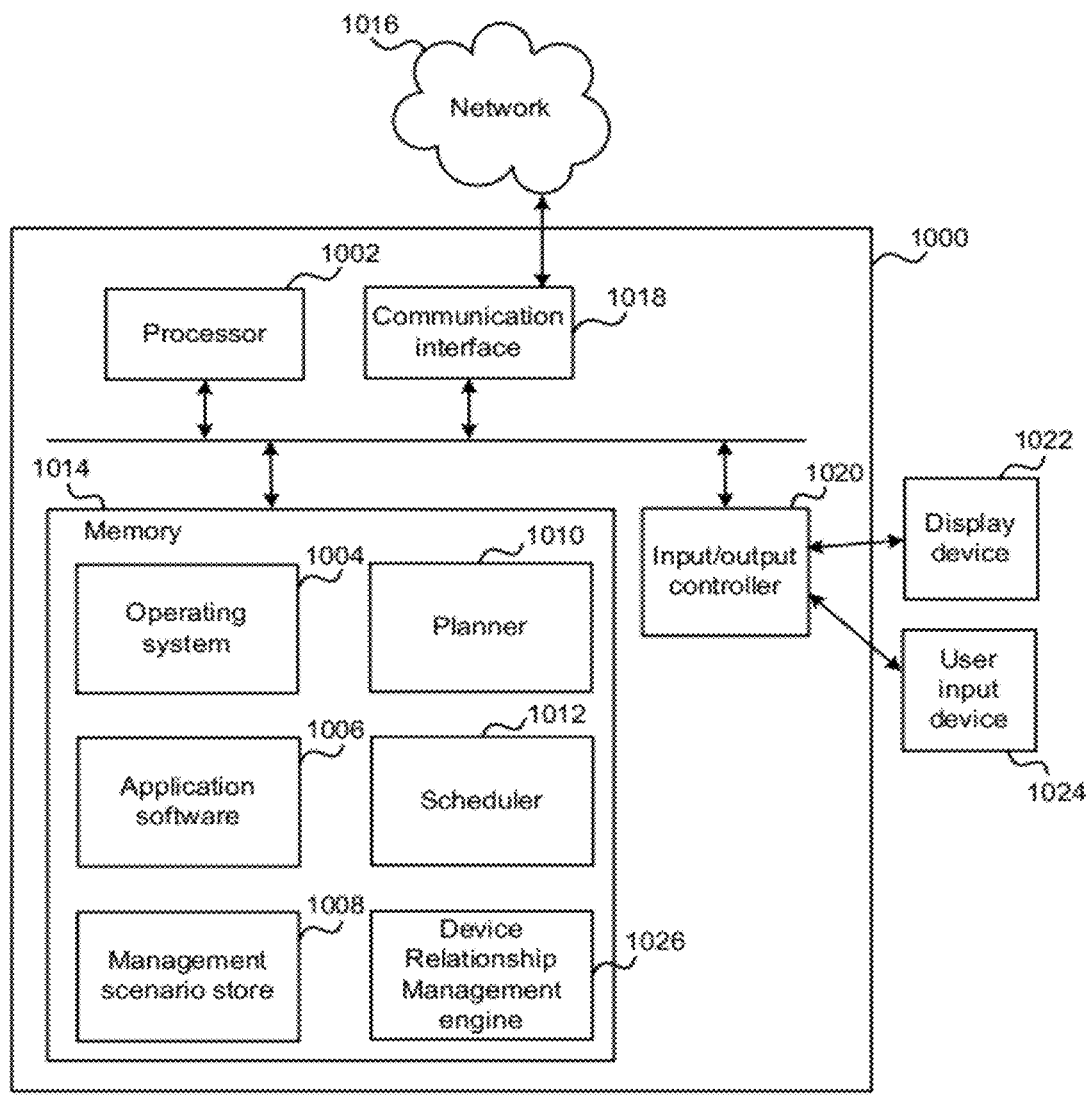
FIG. 10 illustrates an exemplary computing-based entity in which embodiments of a system for managing groups of entities may be implemented.

FIG. 10 illustrates various components of an exemplary computing-based entity 1000 which may be implemented as any form of a computing and/or electronic entity, and in which embodiments of entity management may be implemented.

Computing-based entity 1000 comprises one or more processors 1002 which may be microprocessors, controllers or any other suitable type of processors for processing computing executable instructions to control the operation of the entity in order to manage groups of entities. In some examples, for example where a system on a chip architecture is used, the processors 1002 may include one or more fixed function blocks which implement a part of the method of managing groups of computing entities in hardware (rather than software or firmware). Platform software comprising an operating system 1004 or any other suitable platform software may be provided at the computing-based entity to enable application software 1006 to be executed on the entity. A entity relationship management engine 1026 may also be executed on the entity. Management scenarios may be stored in a management scenario store 1008 implemented at memory 1014. A planner 1010 and a scheduler 1012 may be provided at the computing based entity 1000.

The computer executable instructions may be provided using any computer-readable media that is accessible by computing based entity 1000. Computer-readable media may include, for example, computer storage media such as memory 1014 and communications media. Computer storage media, such as memory 1014, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage entities, or any other medium that can be used to store information for access by a computing entity. In contrast, communication media may embody computer readable instructions, data structures, program modules, or other data in a modulated data signal, such as a carrier wave, or other transport mechanism. Although the computer storage media (memory 1014) is shown within the computing-based entity 1000 it will be appreciated that the storage may be distributed or located remotely and accessed via a network 1016 or other communication link (e.g. using communication interface 1018).

An output is also provided such as an audio and/or video output to a display system integral with or in communication with the computing-based entity. The display system may provide a graphical user interface, or other user interface of any suitable type although this is not essential.

The computing-based entity 1000 also comprises an input/output controller 1020 arranged to output display information to a display entity 1022 which may be separate from or integral to the computing-based entity 1000. The display information may provide a graphical user interface. The input/output controller 1020 is also arranged to receive and process input from one or more entities, such as a user input entity 1024 (e.g. a mouse or a keyboard). This user input may be used to input user designed management scenarios. In an embodiment the display entity 1022 may also act as the user input entity 1024 if it is a touch sensitive display entity. The input/output controller 1020 may also output data to entities other than the display entity, e.g. a locally connected printing entity (not shown in FIG. 10).

The term 'computer' is used herein to refer to any entity with processing capability such that it can execute instructions. Those skilled in the art will realize that such processing capabilities are incorporated into many different entities and therefore the term 'computer' includes PCs, servers, mobile telephones, personal digital assistants and many other entities.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage entities utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or entity value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

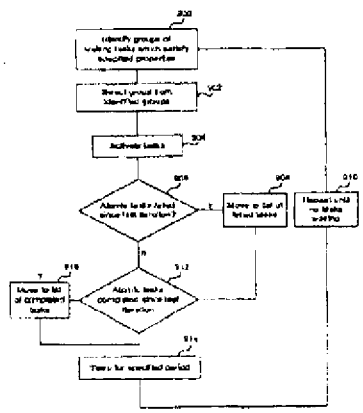

The invention claimed is:

1. A method of collectively managing a plurality of computing entities comprising:
   at an entity relationship management engine receiving a management scenario comprising:
   a task block stating tasks to be performed and specifying which of the computing entities the tasks are to be applied to;
   a dependency block comprising at least one dependency statement to be applied to tasks from the task block, the at least one dependency statement being any of a sequential dependency statement, a dynamic attribute dependency statement, and a synchronization dependency statement; where a sequential dependency statement is a list of at least two tasks to be carried out in a specified order; where a synchronization dependency statement comprises a list of at least two tasks to be started at the same time; and where a dynamic attribute dependency statement comprises at least one task to be carried out on an entity only when a dynamic filter is satisfied on that entity;
   computing a management plan from the management scenario, the management plan comprising a list of atomic tasks expanded from the tasks in the task block and also comprising binary relations between pairs of tasks calculated from the dependency statement;
   using the management plan to control execution of the tasks on the entities by scheduling the atomic tasks in a manner which takes into account at least some of the binary relations calculated from the dependency statement.

2. A method as claimed in claim 1 wherein receiving the management scenario comprises receiving a management scenario with at least one concurrent dependency statement which specifies a maximum number of tasks to be worked on at any given time.

3. A method as claimed in claim 1 wherein receiving the management scenario comprises receiving a management scenario having a sequential dependency statement which is a list of at least two tasks to be carried out in a specified order, each task having success conditions that are to be met before the next task in the specified order is to be carried out.

4. A method as claimed in claim 1 wherein receiving the management scenario comprises receiving a management scenario having a task block comprising at least one task statement, where a task statement is any of: an atomic task which applies one management operation to one entity; and a task loop which applies a task to a plurality of entities.

5. A method as claimed in claim 1 wherein receiving the management scenario comprises receiving a management scenario comprising at least one list being any of: a list of attributes, a list of tasks, a list of entities and a list of sequential items where a sequential item is a task with a specified success condition.

6. A method as claimed in claim 1 comprising validating the management plan by checking at least some of the computed binary relations to ensure the absence of ordering conflicts.

7. A method as claimed in claim 1 wherein computing the management plan comprises computing any of: a synchronization relation between all possible pairs of the atomic tasks; and an ordering relation between all possible pairs of the atomic tasks; both by using dependency information from the dependency block and by carrying out a transitive closure computation.

8. A method as claimed in claim 7 comprising computing the ordering relation between pairs of atomic tasks and using that ordering relation to validate the management plan by checking for ordering conflicts.

9. A method as claimed in claim 7 comprising forming a table data structure having a row for each atomic task and a column for each atomic task and recording the presence of a binary relation between a pair of atomic tasks in a cell of the table data structure indexed by the pair of atomic tasks according to the dependency information from the dependency block and according to the transitive closure computation.

10. A method as claimed in claim 1 wherein computing the management plan comprises forming a list of tasks with success conditions and computing ordering binary relations between tasks in that list and wherein using the management plan to control execution of the tasks on the entities comprises checking the activation conditions of the atomic tasks by inspecting the binary relations between tasks in the list of tasks with success conditions.

11. A method as claimed in claim 10 wherein computing the ordering binary relations between tasks in the list comprises forming a table data structure having a row for each task with success condition and a column for each task with success condition and recording the presence of an ordering binary relation between a pair of tasks with success conditions in a cell of the table data structure indexed by the pair of tasks with success conditions according to the sequential dependency information from the dependency block.

12. A method of generating a management plan for collectively managing a plurality of computing entities comprising:
at an entity relationship management engine receiving a management scenario comprising:
a task block stating tasks to be performed and specifying which of the computing entities the tasks are to be applied to;
a dependency block comprising at least one dependency statement to be applied to tasks from the task block, the at least one dependency statement being any of a sequential dependency statement, a dynamic attribute dependency statement, and a synchronization dependency statement; where a sequential dependency statement is a list of at least two tasks to be carried out in a specified order; where a synchronization dependency statement comprises a list of at least two tasks to be started at the same time; and where a dynamic attribute dependency statement comprises at least one task to be carried out on an entity only when a dynamic filter is satisfied on that entity;
computing a management plan from the management scenario, the management plan comprising a list of atomic tasks expanded from the tasks in the task block and also comprising binary relations between pairs of tasks calculated from the dependency statement; each atomic task being a management operation to be applied to an entity.

13. A method as claimed in claim 12 wherein computing the management plan comprises forming a list of tasks with success conditions and computing ordering binary relations between tasks in that list.

14. A method as claimed in claim 13 wherein computing the ordering binary relations between tasks in the list of tasks with success conditions comprises forming a table data structure having a row for each task with success condition and a column for each task with success condition and recording the presence of an ordering binary relation between a pair of tasks with success conditions in a cell of the table data structure indexed by the pair of tasks with success conditions according to sequential dependency information from the dependency block.

15. A method as claimed in claim 12 wherein receiving the management scenario comprises receiving a management scenario comprising at least one list being any of: a list of attributes, a list of tasks, a list of entities and a list of sequential items where a sequential item is a task with a specified success condition.

16. A method as claimed in claim 15 wherein receiving the management scenario comprises receiving a management scenario comprising at least one list comprising a list variable.

17. A system for collectively managing a plurality of computing entities, the system comprising:
a management scenario stored in memory and comprising:
a task block stating tasks to be performed and specifying which of the computing entities the tasks are to be applied to;
a dependency block comprising at least one dependency statement to be applied to tasks from the task block, the at least one dependency statement being any of a sequential dependency statement, a dynamic attribute dependency statement, and a synchronization dependency statement; where a sequential dependency statement is a list of at least two tasks to be carried out in a specified order; where a synchronization dependency statement comprises a list of at least two tasks to be started at the same time; and where a dynamic attribute dependency statement comprises at least one task to be carried out on a computing entity only when a dynamic filter is satisfied on that computing entity;
a plan generator arranged to generate a management plan from the management scenario comprising a list of atomic tasks expanded from the tasks in the task block and also comprising binary relations between pairs of tasks calculated from the dependency statement; each atomic task being a management operation to be applied to a computing entity;

a runtime scheduler arranged to run the atomic tasks of the management plan in a manner taking into account at least some of the binary relations of the management plan.

18. A system as claimed in claim 17 wherein the plan generator is arranged to verify the management plan by using at least some of the binary relations between pairs of tasks to check for ordering conflicts.

19. A system as claimed in claim 17 wherein the plan generator is arranged to form a list of tasks with success conditions and to compute ordering binary relations between tasks in that list.

* * * * *

UNITED STATES PATENT AND TRADEMARK OFFICE
CERTIFICATE OF CORRECTION

| | |
|---|---|
| PATENT NO. | : 8,381,218 B2 |
| APPLICATION NO. | : 12/956281 |
| DATED | : February 19, 2013 |
| INVENTOR(S) | : Periorellis et al. |

It is certified that error appears in the above-identified patent and that said Letters Patent is hereby corrected as shown below:

Delete the title page and substitute the attached title page therefor.

On title page, in item (56), under "Other Publications" column 2, line 26, delete "Newslatter," and insert -- Newsletter, --, therefor.

In the Specification

In column 5, line 62 (approx.), after "<list of tasks>" insert -- | --.

In column 7, line 14, delete "non" and insert -- none --, therefor.

In column 7, line 64 (approx.), after "completion" insert -- ) --.

In column 9, line 29, delete "it's" and insert -- its --, therefor.

In column 12, line 21, delete "use" and insert -- used --, therefor.

In column 14, line 47, delete "it's" and insert -- its --, therefor.

In column 16, line 25, delete "transistivity" and insert -- transitivity --, therefor.

In the Claims

In column 24, line 6, in Claim 19, below "list" insert -- 20. A system as claimed in claim 19 wherein the runtime scheduler is arranged to assess activation conditions of atomic tasks by taking into account the ordering binary relations between tasks in the list of tasks with success conditions. --.

Signed and Sealed this
Seventh Day of July, 2015

Michelle K. Lee
*Director of the United States Patent and Trademark Office*

(12) United States Patent
Periorellis et al.

(10) Patent No.: US 8,381,218 B2
(45) Date of Patent: Feb. 19, 2013

(54) MANAGING GROUPS OF COMPUTING ENTITIES

(75) Inventors: Panos Periorellis, Aachen (DE); Lucas Bordeaux, Cambridge (GB); Jeremiah Clayton Spradlin, Seattle, WA (US); Adi Ionel Botea, Canberra (AU)

(73) Assignee: Microsoft Corporation, Redmond, WA (US)

( * ) Notice: Subject to any disclaimer, the term of this patent is extended or adjusted under 35 U.S.C. 154(b) by 263 days.

(21) Appl. No.: 12/956,281

(22) Filed: Nov. 30, 2010

(65) Prior Publication Data
US 2012/0137298 A1 May 31, 2012

(51) Int. Cl.
*G06F 9/46* (2006.01)
(52) U.S. Cl. .................................. 718/102; 718/107
(58) Field of Classification Search .............. 718/100, 718/102, 103, 104, 107
See application file for complete search history.

(56) References Cited

U.S. PATENT DOCUMENTS

| | | | |
|---|---|---|---|
| 7,020,878 B1 * | 3/2006 | Rhee et al. ............... | 718/104 |
| 7,222,330 B2 * | 5/2007 | Bicknell et al. ........... | 717/101 |
| 7,526,767 B1 * | 4/2009 | Rhee et al. ............... | 718/104 |
| 7,984,441 B2 * | 7/2011 | Briccarello et al. ....... | 718/102 |
| 8,117,606 B2 * | 2/2012 | Chakrabarti et al. ...... | 717/156 |
| 2005/0027871 A1 | 2/2005 | Bradley et al. | |
| 2008/0295102 A1 * | 11/2008 | Akaike et al. ............. | 718/102 |
| 2009/0241117 A1 | 9/2009 | Dasgupta et al. | |

OTHER PUBLICATIONS

Argelich, et al., "CNF Instances from the Software Package Installation Problem", retrieved on Sep. 20, 2010, Proceedings of Int'l RCRA workshop: Experimental Evaluation of Algorithms for Solving Problems with Combinatorial Explosion, Udine, Italy, Dec. 2008, pp. 1-12.

"Automating .NET Application Deployment and Configuration", retrieved on Sep. 20, 2010 at <<http://www.rpath.com/corp/images/stories/white_papers/rPath_WP_Windows.pdf>>, rPath, White Paper, 2010, pp. 1-10.

Brittenham, et al., "IT service management architecture and autonomic computing", retrieved on Sep. 20, 2010 at <<http://ieeexplore.ieee.org/stamp/stamp.jsp?arnumber=05386560>>, IBM Systems Journal, vol. 46, No. 3, 2007, pp. 565-581.

"CUDF Primer Concepts", retrieved on Sep. 20, 2010 at <<http://www.mancoosi.org/cudf/primer/>>, Mancoosi, 2010, pp. 1-3.

Di Cosmo, et al., "Package Upgrades in FOSS Distributions: Details and Challenges", retrieved on Sep. 20, 2010, Proceedings of Int'l Workshop on Hot Topics in Software Upgrades (HotSWUp), Nashville, Tennessee, Oct. 20, 2008, pp. 1-5.

"FireScope Orchestrate Solutions", retrieved on Sep. 20, 2010 at <<http://www.firescope.com/Solutions/Orchestrate/Default.asp>>, FireScope, 2010, pp. 1-6.

"Introducing Microsoft System Center Operations Manager 2007 R2, White Paper", retrieved on Dec. 7, 2010 at <<http://search.microsoft.com/results.aspx?mkt=en-US&setlang=en-US&q=Introduction+to+System+Center+Service+Manager+&form=MSSBCUS>> Microsoft Corporation, May 2009, pp. 1-21.

McGlynn, "Accelerating Problem Resolution: Why It Matters and How to Do It", retrieved on Sep. 20, 2010 at <<http://www.itsmsolutions.com/newsletters/DITYvol5iss10.htm>>, itSM Solutions, DITY Weekly Newsletter, vol. 5.10, Mar. 11, 2010, pp. 1-3.

* cited by examiner

*Primary Examiner* — Van Nguyen
(74) *Attorney, Agent, or Firm* — Zete Law, P.L.L.C.; MacLane C. Key

(57) ABSTRACT

Managing groups of entities is described. In an embodiment an administrator manages operations on a plurality of entities by constructing a management scenario which defines tasks to be applied on a group of entities. In an example the management scenario includes information on dependencies between entities and information on entity attributes, for example operating system version or CPU usage. In an embodiment an entity management engine converts the tasks and dependencies in the scenario to a management plan. In an example the management plan is a list of operations and conditions to be respected in applying an operation to an entity. In an embodiment the plan can be validated to ensure there are no conflicts. In an embodiment the entity management engine also comprises a scheduler which runs tasks contained in the plan and monitors their outcome.

20 Claims, 10 Drawing Sheets